US008987933B2

(12) United States Patent
Yu

(10) Patent No.: US 8,987,933 B2
(45) Date of Patent: Mar. 24, 2015

(54) POWER OVER ONE-PAIR ETHERNET APPROACH

(75) Inventor: James Yu, Pleasonton, CA (US)

(73) Assignee: Broadcom Corporation, Irvine, CA (US)

( * ) Notice: Subject to any disclaimer, the term of this patent is extended or adjusted under 35 U.S.C. 154(b) by 493 days.

(21) Appl. No.: 13/460,093

(22) Filed: Apr. 30, 2012

(65) Prior Publication Data

US 2013/0285468 A1 Oct. 31, 2013

(51) Int. Cl.

*H02J 1/00* (2006.01)
*H04B 3/54* (2006.01)
*H04L 12/10* (2006.01)

(52) U.S. Cl.

CPC ................ *H04B 3/548* (2013.01); *H04L 12/10* (2013.01)
USPC ........................................................... 307/4

(58) Field of Classification Search

USPC ........................................................... 307/4
See application file for complete search history.

(56) References Cited

U.S. PATENT DOCUMENTS 8,044,747 B2 10/2011 Yu et al.
2010/0277293 A1 11/2010 Yu et al.

OTHER PUBLICATIONS

TW Office Action, Oct. 3, 2014.
EP Search Report, Aug. 6, 2013.

*Primary Examiner* — Robert L. Deberadinis
(74) *Attorney, Agent, or Firm* — Duane S. Kobayashi

(57) ABSTRACT

A power over one-pair Ethernet approach. A data transformer is coupled to a single conductor pair using one or more direct current (DC) blocking elements that preserve an alternating current path. The data transformer enables a network device to transmit and receive data with a link partner device via the single conductor pair. Power transmission over the single conductor pair is enabled through the coupling of a power over Ethernet module to the single conductor pair using a diode that can be paired with a zener diode.

16 Claims, 8 Drawing Sheets

PHY
PHY
I
I
I
I
I
I
D1
D2
D3
D4
330
PSE
PD
340

POWER OVER ONE-PAIR ETHERNET APPROACH

BACKGROUND

1. Field of the Invention

The present invention relates generally to Ethernet systems and method and, more particularly, to a power over one-pair Ethernet approach.

2. Introduction

Power over Ethernet (also known as inline power and phantom power) specifications such as IEEE 802.3af and 802.3at provide a framework for delivery of power over Ethernet cabling. Various types of devices can be powered over Ethernet cabling, including voice over IP (VoIP) phones, wireless LAN access points, Bluetooth access points, network cameras, computing devices, etc.

Conventionally, the power over Ethernet specifications are designed to work on two-pair cabling using a pair of transformers. Power over Ethernet is capable of running over a worst case distance of 100 meters on two wire pairs of Category 3 Ethernet cabling and higher power devices are capable of running on a worst case distance of 100 meters on two pairs of Category 5 Ethernet cabling.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

An approach for powering in a one-pair conductor Ethernet transmission system is provided. A power over Ethernet (PoE) module such as a power sourcing equipment (PSE) or powered device (PD) is coupled to the one-pair conductor via a frequency insensitive coupling component that blocks data transmission signals from interfering with the power over Ethernet module. The frequency insensitive characteristic of the coupling component ensures that low-frequency signals such as those used during a period of auto-negotiation between physical layer devices (PHYs) are not passed to the power over Ethernet module. In one embodiment, the frequency insensitive component is based on back-to-back diode and zener diode pairs.

Figure 1:
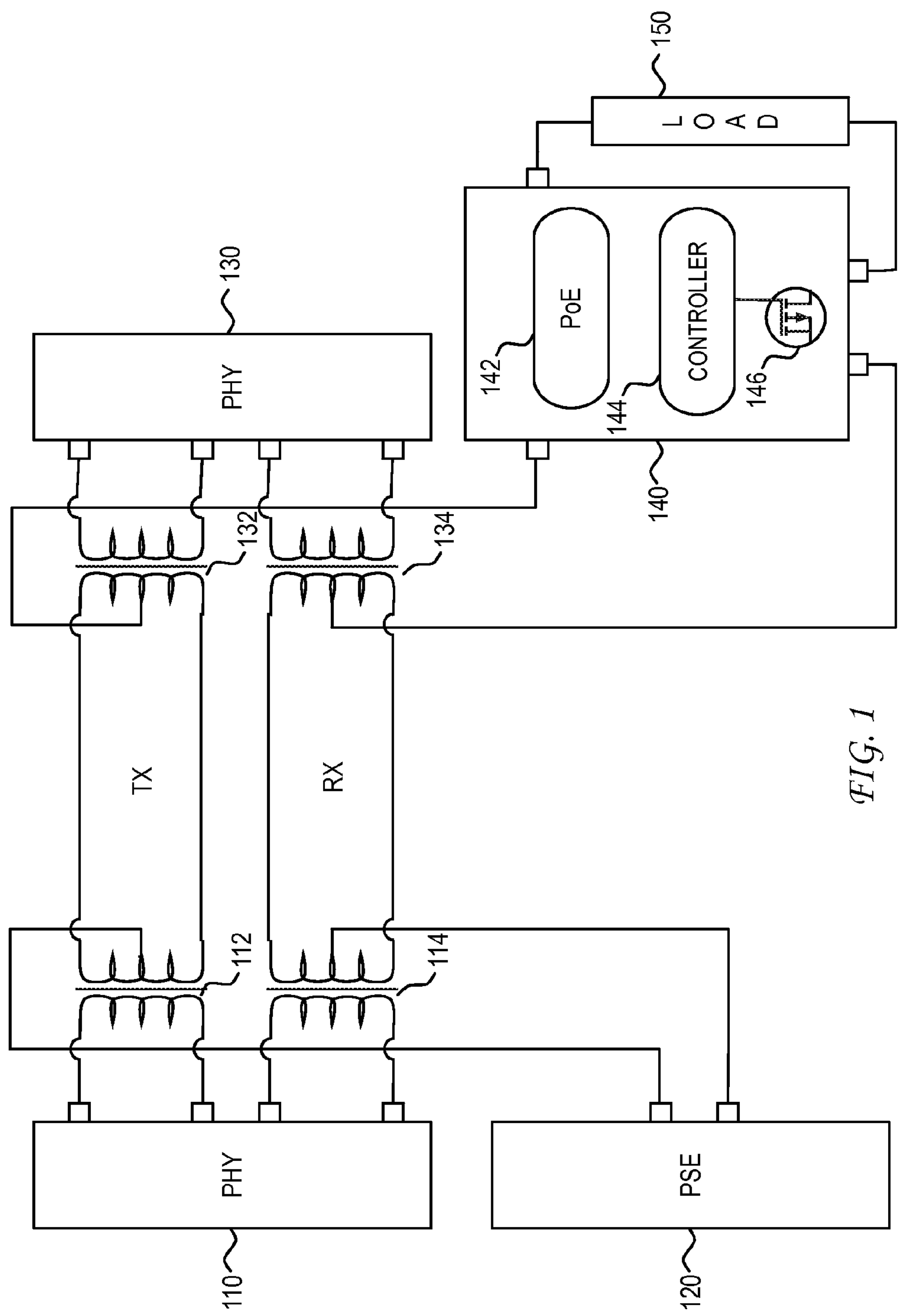
FIG. 1 illustrates an embodiment of a two-pair power over Ethernet system.

FIG. 1 illustrates an example of a two-pair PoE system. As illustrated, the two-pair PoE system includes PSE 120 that transmits power to PD 140 over two conductor pairs such as two twisted wire pairs. Power delivered by PSE 120 to PD 140 is provided through the application of a voltage across the center taps of a first data transformer 112 that is coupled to a transmit (TX) wire pair and a second data transformer 114 that is coupled to a receive (RX) wire pair carried within an Ethernet cable. PD 140 receives the power transmitted by PSE 120 at the center taps of a third data transformer 132 that is coupled to the TX wire pair and a fourth data transformer 134 that is coupled to the RX wire pair.

As is further illustrated in FIG. 1, PD 140 includes PoE module 142. PoE module 142 includes the electronics that would enable PD 140 to communicate with PSE 120 in accordance with a PoE specification such as IEEE 802.3af, 802.3at, legacy PoE transmission, or any other type of PoE transmission. PD 140 also includes controller 144 (e.g., pulse width modulation DC:DC controller) that controls power transistor 146 (e.g., FET or bipolar), which in turn provides constant power to load 150.

In the illustration of FIG. 1, power is delivered by PSE 120 to PD 140 via two conductor pairs through connections to the center taps of data transformers 112 and 114 on the PSE side and connections to the center taps of data transformers 132 and 134 on the PD side. As a significant number of installations contain one-pair wiring, one-pair PoE systems are also needed to address these potential markets.

Figure 2:
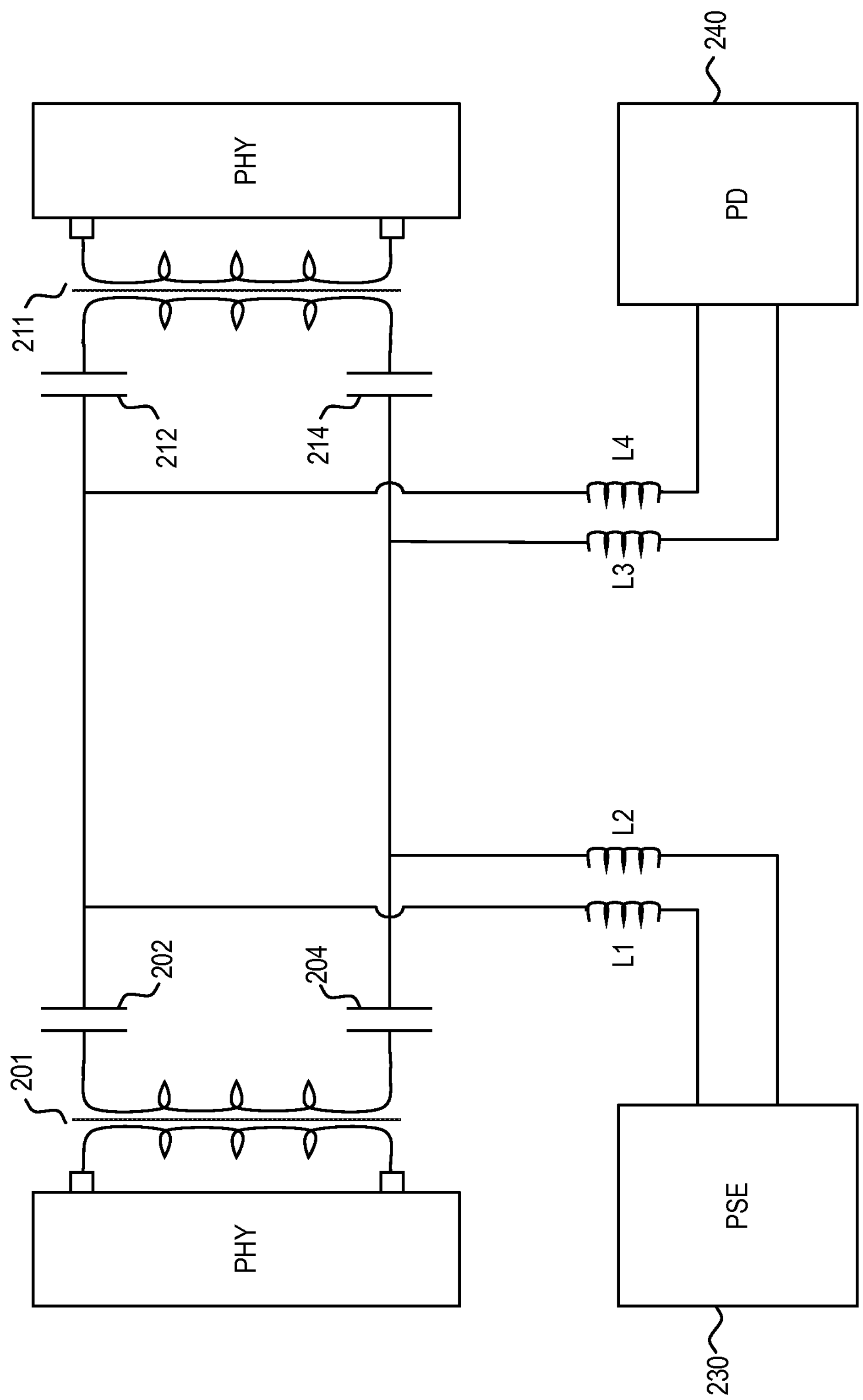
FIG. 2 illustrates an example of a single-pair power over Ethernet system using inductors.

FIG. 2 illustrates an example of an application of PoE to a one-pair Ethernet system. An example of such a one-pair Ethernet system is Broadcom's BroadR-Reach® technology that supports both 100-meter traditional Ethernet services and other applications that require longer than 100-meter reach or operation over a single conductor pair. In various examples, the extended reach broadens the range of cable installations and can be used for new IP services and applications such as broadband access, voice over IP, wireless access points, and surveillance cameras.

For one-pair installations, only a single data transformer is used at the PSE and the PD. As illustrated, single data transformer 201 is used on the PSE side, while single data transformer 211 is used on the PD side. In this one-pair installation, DC isolation of data transformers 201, 211 is enabled through the introduction of capacitive elements 202, 204 on the PSE side and capacitive elements 212, 214 on the PD side. In one example, one-pair Ethernet can be used to facilitate an automotive Ethernet transceiver that supports data transmission (e.g., 100 Mbps) using one-pair unshielded twisted-pair (UTP) cabling. As would be appreciated, various other types of PDs can be supported using conductive media that is conducive to such an application.

As illustrated, power is injected onto the single conductor pair by PSE 230 after blocking capacitors 202, 204. Similarly, power is extracted from the single conductor pair by PD 240 before blocking capacitors 212, 214. In this arrangement, capacitors 202, 204 on the PSE side and capacitors 212, 214 on the PD side are designed to block or otherwise prevent DC current injected by PSE 230 from flowing into data transformers 201, 211. Saturation of data transformers 201, 211 by the injection of power onto the one-pair conductor is thereby prevented. Significantly, capacitors 202, 204 on the PSE side and capacitors 212, 214 on the PD side do not impact the data transmission between the PHYs as AC current passes through capacitors 202, 204, 212, 214.

When introducing power over a one-pair Ethernet transmission system, the PoE modules can affect the differential impedance required by the PHYs. This can cause return loss issues, signal distortion, etc. To avoid such an adverse impact to the transmission system, high impedance inductors L1, L2, L3, and L4 can be used to couple both PSE 230 and PD 240 to the single conductor pair. More specifically, PSE 230 can be coupled to the single conductor pair using inductors L1 and L2, while PD 240 can be coupled to the single conductor pair using inductors L3 and L4.

In some applications, the space in which the PoE system operates is limited. An example of such a space-constrained application is an automotive digital camera application. In this example environment, space limitations are even more pronounced as the components that support the delivery of power over the one-pair conductor are required to abide by tighter compartment constraints. In these and other space-constrained applications, a very small-sized inductor would therefore be needed. Scaling down the size of the inductor can present various issues.

First, a smaller-sized inductor typically has lower inductance when having the same current rating. As the impedance of an inductor is defined by $X_L=j\omega L$, where $\omega=2\pi f$, lower inductance will also produce a lower impedance. Thus, the small-sized inductor could not meet the requirement for isolation. Second, the impedance $X_L$ has a value that varies with frequency, such that the impedance $X_L$ will be low when the frequency is low. This dependence on frequency can produce further issues during the period of auto-negotiation between the PHYs as the frequency of the auto-negotiation signals is much lower. Here, the smaller-sized inductor may not be able to block the lower frequency auto-negotiation signals from passing into the power over Ethernet module, thereby causing the auto-negotiation process to fail. Finally, the small-sized inductor has a higher DC resistance. This higher DC resistance would cause a greater DC voltage drop across the inductor as more power is consumed by the inductor itself. This consumption of power is particularly significant in a power over Ethernet application as it would diminish the amount of power that could be delivered by the PSE to the PD via the one-pair conductor.

Figure 3:
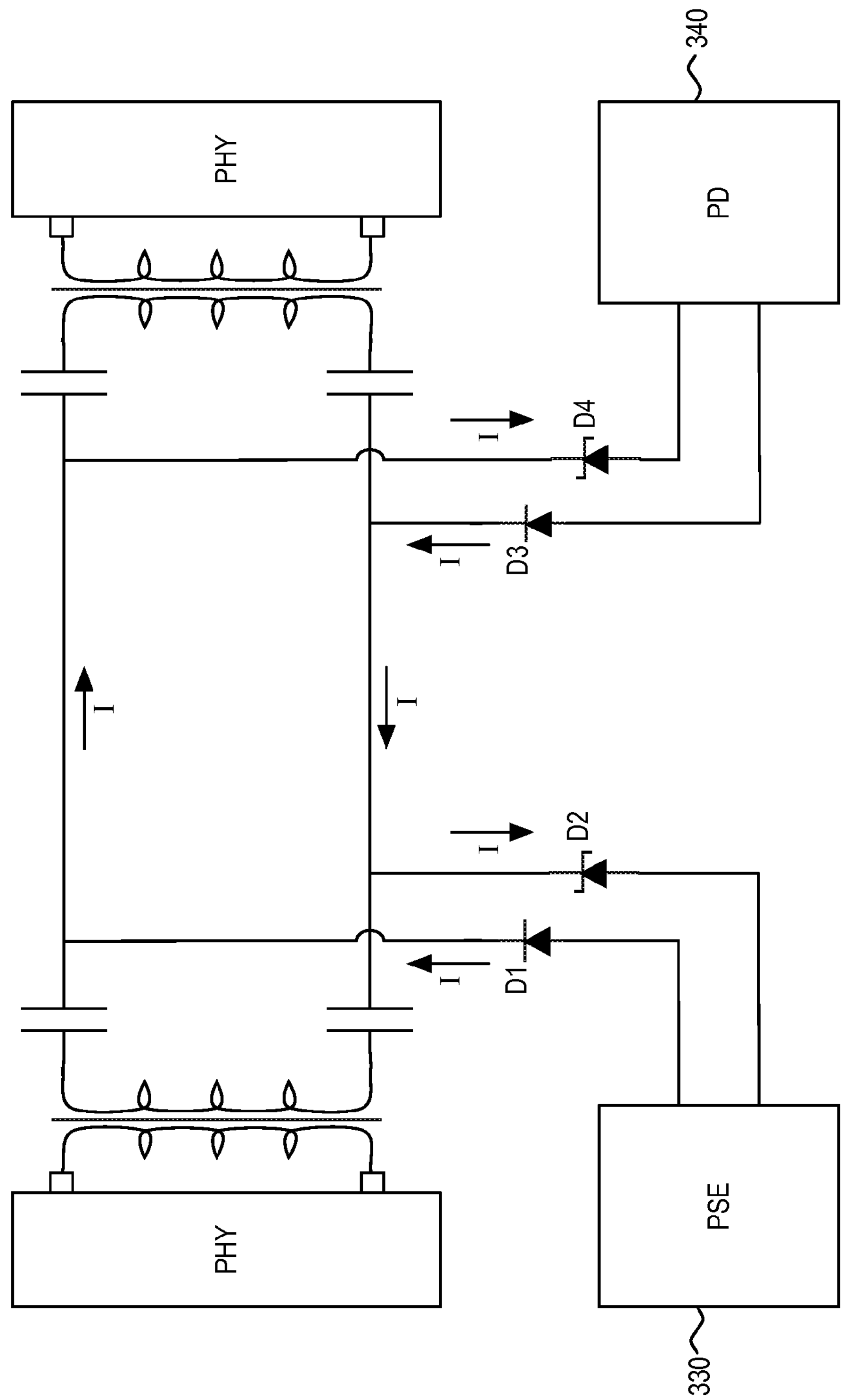
FIGS. 3-8 illustrate example embodiments of powering over a single conductor pair transmission system using diodes and zener diodes.

In the present invention, it is recognized that these and other attendant issues can be alleviated by the coupling of a PoE module to the one-pair conductor using a frequency-insensitive coupling component. FIG. 3 illustrates an example embodiment of a frequency-insensitive coupling component that can be applied to powering over a one-pair Ethernet system.

As illustrated in the example embodiment, both PSE 330 and PD 340 are coupled to the one-pair conductor via a frequency-insensitive diode and zener diode pair. More specifically, PSE 330 is coupled to the one-pair conductor via diode D1 and zener diode D2, while PD 340 is coupled to the one-pair conductor via diode D3 and zener diode D4. In the present invention, it is recognized that a diode/zener pair can serve to enable AC isolation of the power over Ethernet module from the data transmission on the one-conductor pair. Here, diode D1 would only allow current to flow in its forward-biased direction, while zener diode D2 would only allow current to flow in its reverse-biased direction (or reverse breakdown mode).

FIG. 3 illustrates the direction of current flow through the forward-biased diodes D1, D3 and the reverse-biased zener diodes D2, D4. From the DC current point of view, the diodes D1, D3 and zener diodes D2, D4 would allow the DC current to pass and PSE 330 would not be inhibited from delivering DC power to PD 340 via the one-conductor pair.

It is a feature of the present invention that the AC blocking mechanism is frequency insensitive and would not impact the differential impedance needed by the data transmission system. Moreover, the diode can be embodied as a low forward voltage diode and the zener diode can be embodied as a low reverse voltage zener diode, which would reduce the voltage drops across the diode and zener diodes. This would not significantly diminish the amount of power that could be delivered by the PSE to the PD via the one-pair conductor. In one example embodiment, the zener diode can be embodied as a 1.5V 1 W zener diode, which would have an equivalent or lower voltage drop as compared to a comparable inductor that could be used. This example zener diode would also have less power consumption.

Figure 4:
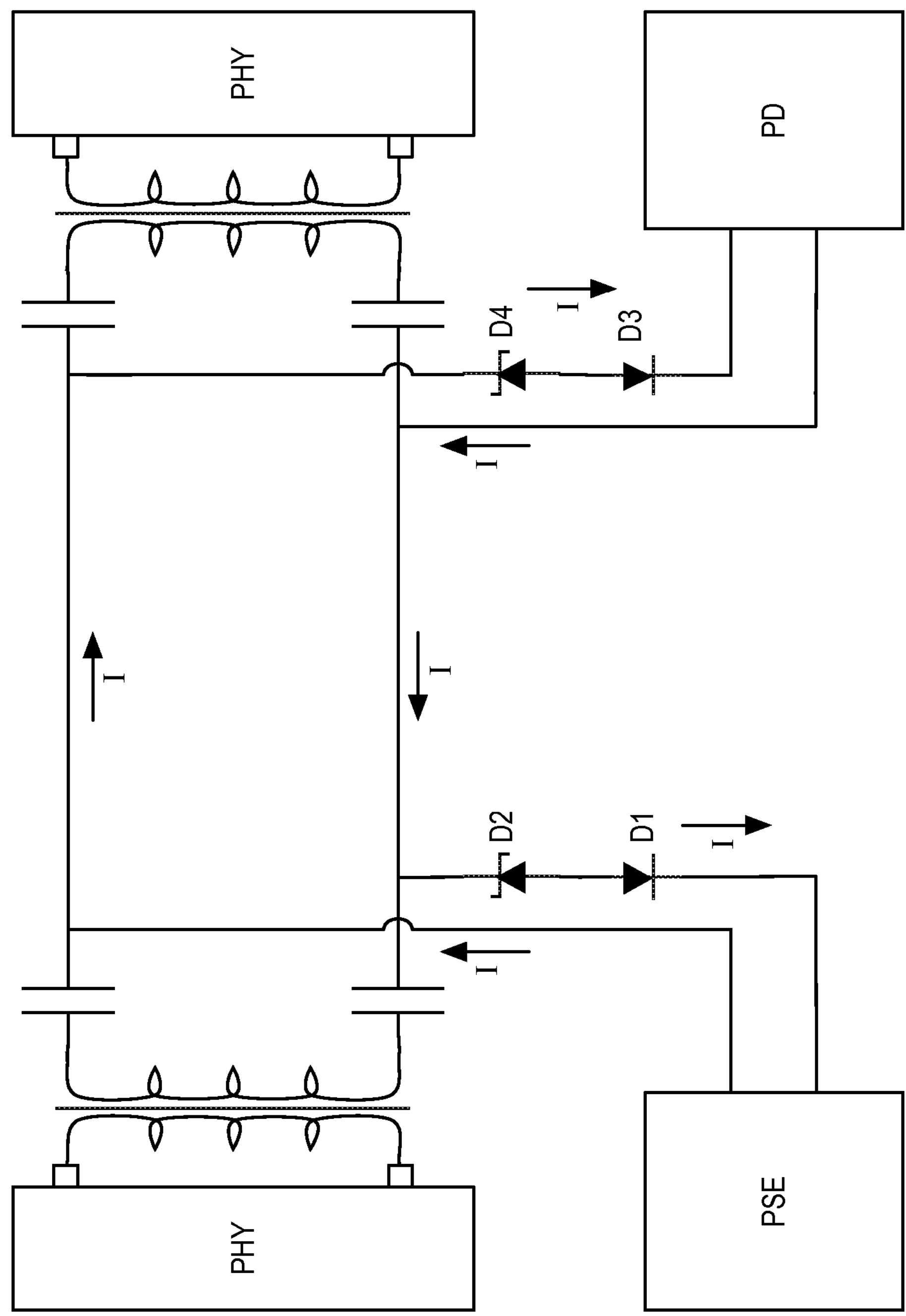
Figure 5:
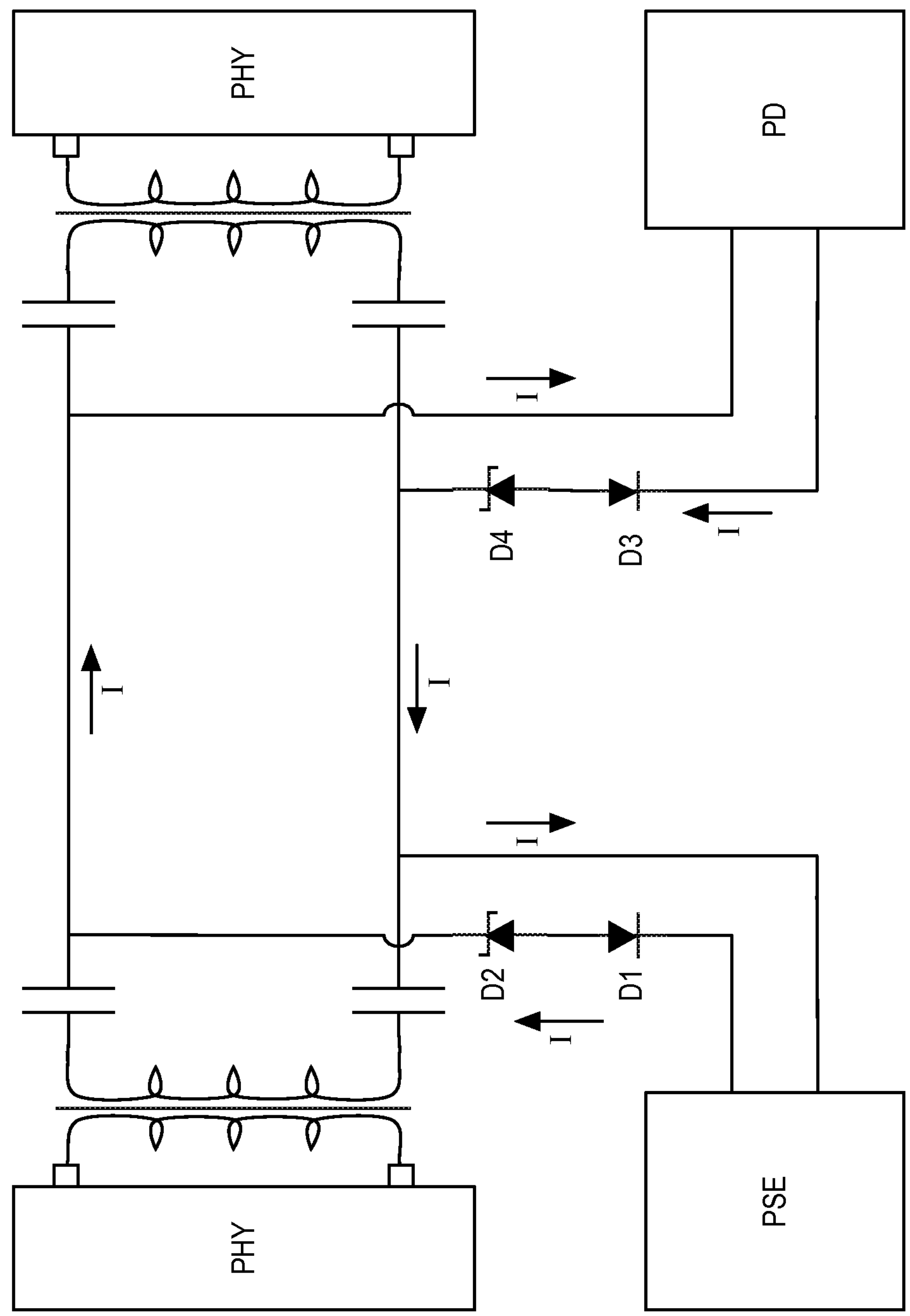

As would be appreciated, the particular location of the diodes and zener diodes relative to the PSE and PD's coupling to the single conductor pair can vary. As illustrated in FIGS. 4 and 5, the diode and zener diodes can be placed back-to-back on one side of the coupling of the PSE or PD to the one-conductor pair.

Figure 6:
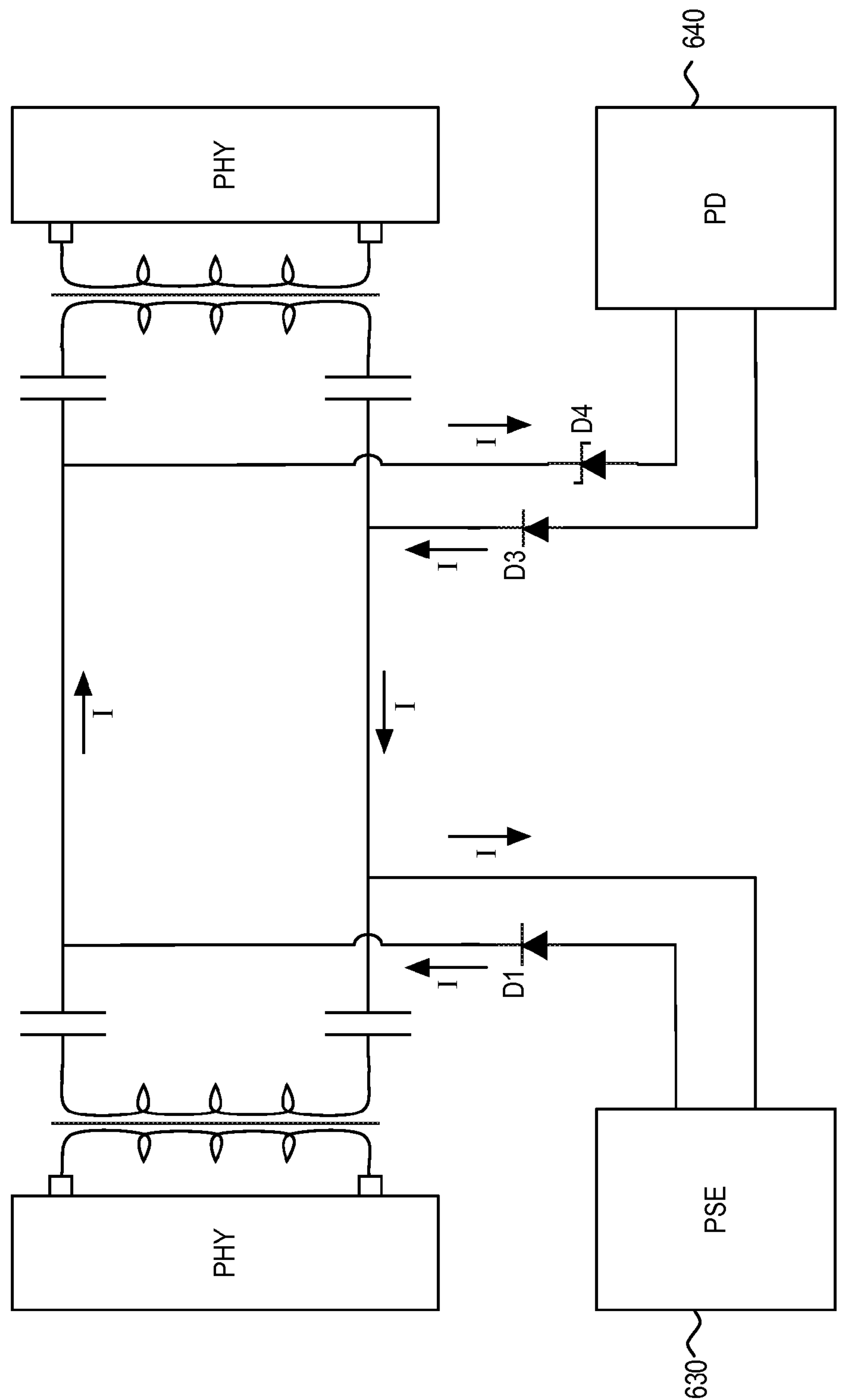

As described, a diode/zener pair can be used to provide AC isolation for an individual power over Ethernet module. Where the power over Ethernet module itself does not produce significant low-frequency noise that can potentially disrupt the data transmission over the one-pair conductor, the zener diode can be removed. FIG. 6 illustrates an example embodiment where the PSE 630 produces little to no low-frequency noise. In this example scenario, the zener diode D2 on the PSE side can be removed. This example embodiment represents a typical application where PSE 630 produces little to no low-frequency noise, while PD 640 produces significant low-frequency noise (e.g., noise produced by a switching regulator).

Figure 7:
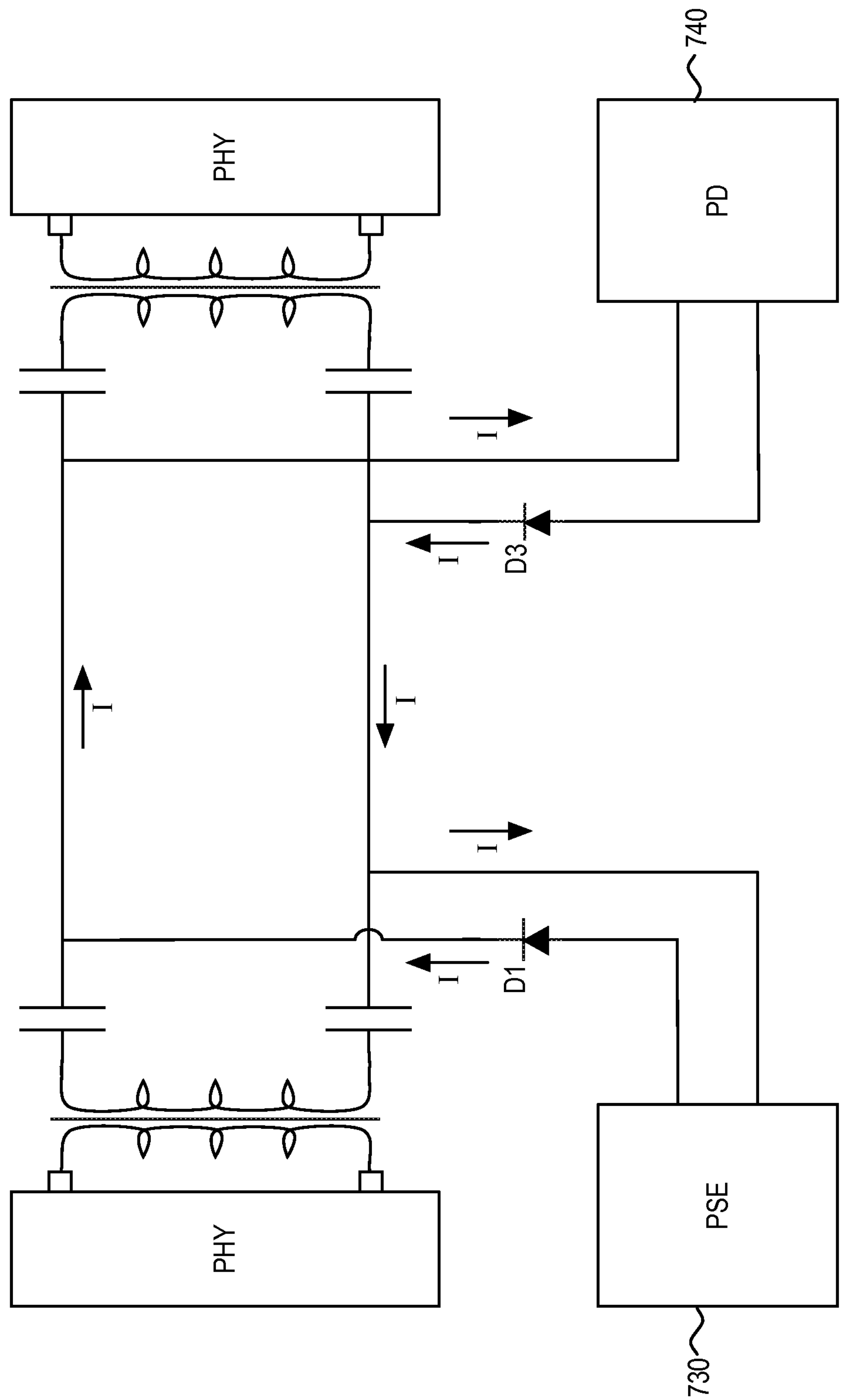
Figure 8:
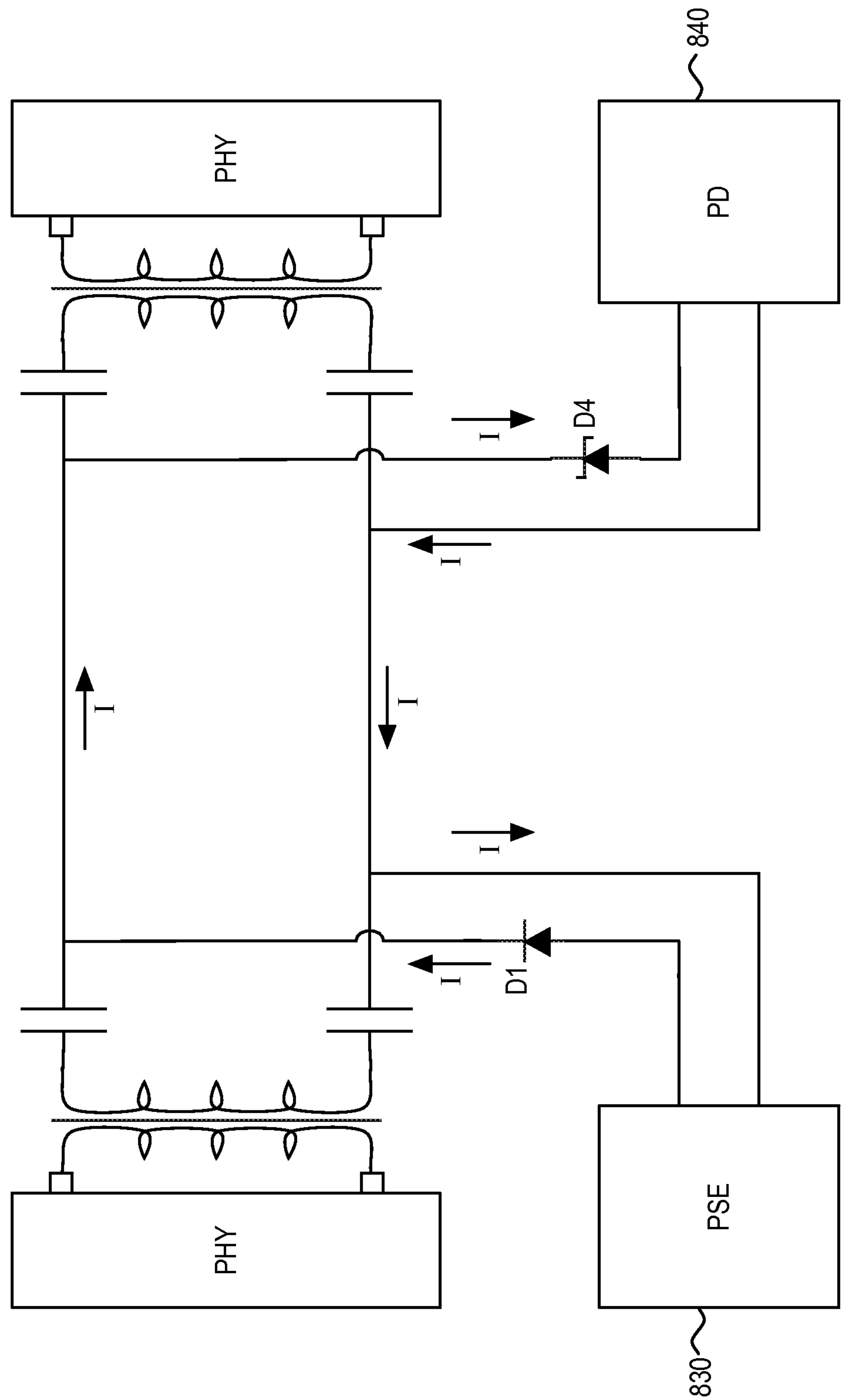

Where, neither the PSE nor the PD produces significant low-frequency noise, the zener diodes on both the PSE and PD sides can be removed. FIG. 7 illustrates an example of such an embodiment. As illustrated, zener diode D2 has been removed from the coupling of PSE 730 to the one-pair conductor, and zener diode D4 has been removed from the coupling of PD 740 to the one-pair conductor. Here, it should be noted that the retention of diode D1 and diode D3 will enable isolation of the data transmission signals from entering the power over Ethernet modules. Finally, FIG. 8 illustrates yet another embodiment of a low noise environment where zener diode D2 has been removed from the side of PSE 830 and diode D3 has been removed from the side of PD 840.

As has been described, a diode/zener framework can be used to provide a frequency insensitive mechanism for enabling AC isolation in a one-pair Ethernet transmission system and can be used in space-constrained applications as a replacement for inductors. It should be noted that in one embodiment, the principles of the present invention can be applied to single-pair applications without a data transformer, wherein the data transformer is emulated using integrated circuits.

As would be appreciated, the principles of the present invention can be applied to all types of twisted pair cabling, including Category 2, 3, 5, 6, 7, etc. The principles of the present invention can also be applied to a two-conductor cable such as RG6 coaxial cabling. In general, the principles of the present invention can be used in any transmission system that implements power and/or high-speed communication (e.g., 10 Mbit/s, 100 Mbit/s, 1 Gbit/s Ethernet, etc.) over a single-pair data interface. This is true of standard Ethernet connections or for BroadR-Reach® connections that span greater than 100 meters.

In the above description, reference was made to the 802.3af and 802.3at specifications, which are amendments to the IEEE standard. As would be appreciated, the principles of the present invention would also be applicable to the underlying IEEE standard that incorporates such amendments as well as to future amendments to the IEEE standard.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system that enables power delivery over a single conductor pair to a powered device, comprising:

a data transformer having a first end and a second end;

a first direct current blocking element having a first side coupled to a first end of said data transformer, and a second side coupled to a first conductor of the single conductor pair;

a second direct current element having a first side coupled to a second end of said data transformer, and a second side coupled to a second conductor of the single conductor pair; and a power over Ethernet module coupled to said first conductor and said second conductor of the single conductor pair via a diode and a zener diode pair.

2. The system of claim 1, wherein said first and second direct current blocking elements are capacitors.

3. The system of claim 1, wherein said power over Ethernet module is a power sourcing equipment that transmits power over the single conductor pair.

4. The system of claim 1, wherein said power over Ethernet module is a powered device that receives power over the single conductor pair.

5. The system of claim 1, wherein said single conductor pair is a twisted wire pair.

6. The system of claim 1, wherein said single conductor pair is a coaxial cable.

7. The system of claim 1, wherein a first end of said power over Ethernet module is coupled to said first conductor via said diode and a second end of said power over Ethernet module is coupled to said second conductor via said zener diode.

8. The system of claim 1, wherein a first end of said power over Ethernet module is coupled to a first end of said diode, a second end of said diode being coupled to a first end of said zener diode, and a second end of said zener diode being coupled to said first conductor of the single conductor pair.

9. A network device, comprising:

a data transformer having a first end and a second end, said data transformer enabling the network device to transmit and receive data with a link partner device via a single conductor pair;

a direct current blocking element having a first side coupled to said first end of said data transformer, and a second side coupled to a first conductor of said single conductor pair; and a power over Ethernet module coupled to said first conductor of said single conductor pair via a diode, wherein said power over Ethernet module enables a transmission of power over said single conductor pair.

10. The network device of claim 9, wherein said direct current blocking element is a capacitor.

11. The network device of claim 9, wherein said power over Ethernet module is a power sourcing equipment that transmits power over said single conductor pair.

12. The network device of claim 9, wherein said power over Ethernet module is a powered device that receives power over said single conductor pair.

13. The network device of claim 9, wherein said single conductor pair is a twisted wire pair.

14. The network device of claim 9, wherein said single conductor pair is a coaxial cable.

15. The network device of claim 9, wherein said power over Ethernet module is coupled to a second conductor of said single conductor pair via a zener diode.

16. The network device of claim 9, wherein a first end of said power over Ethernet module is coupled to said first conductor via said diode and a second end of said power over Ethernet module is coupled to a second conductor via said zener diode.

* * * * *